United States Patent
Lee et al.

(10) Patent No.: US 6,514,119 B1
(45) Date of Patent: Feb. 4, 2003

(54) TOY FIGURE WITH ARTICULATING JOINTS

(75) Inventors: James S. W. Lee, Long Island, NY (US); Chiu Keung Kwan, Kowloon (HK)

(73) Assignee: C. J. Associates, Ltd. (HK)

( * ) Notice: Subject to any disclaimer, the term of this patent is extended or adjusted under 35 U.S.C. 154(b) by 0 days.

(21) Appl. No.: 09/550,860

(22) Filed: Apr. 17, 2000

Related U.S. Application Data

(62) Division of application No. 09/088,385, filed on Jun. 1, 1998.

(51) Int. Cl.⁷ .................................................. A63H 3/46
(52) U.S. Cl. ........................................................ 446/384
(58) Field of Search ................................ 446/384, 391, 446/276, 278, 330, 331, 338, 339, 340, 376, 381, 379, 390, 375

(56) References Cited

U.S. PATENT DOCUMENTS

| | | |
|---|---|---|
| 242,210 A * | 5/1881 | Mason et al. ............... 446/384 |
| 292,919 A | 2/1884 | Kihlgren |
| 703,899 A | 7/1902 | Debes |
| 1,270,781 A | 7/1918 | Cabana |
| 1,359,030 A | 11/1920 | Cabana |
| 1,500,921 A | 7/1924 | Bramson et al. |
| 1,595,203 A | 8/1926 | Leathers |
| 1,909,430 A | 5/1933 | Skillman |
| 1,943,631 A | 1/1934 | Skillman |
| 2,007,784 A | 7/1935 | Wittmann |
| 2,027,560 A | 1/1936 | Skillman |
| 2,118,677 A | 5/1938 | Lower |
| 2,129,421 A | 9/1938 | Hales |
| 2,165,473 A | 7/1939 | Greneker |
| 2,285,472 A | 6/1942 | Tenenbaum |
| 2,460,880 A | 2/1949 | Geizer et al. |
| 2,807,119 A | 9/1957 | Beebe |
| 2,954,992 A | 10/1960 | Baker |
| 3,011,219 A | 12/1961 | Williams |
| 3,065,566 A | 11/1962 | Sugimoto |
| 3,094,376 A | 6/1963 | Thomas |
| 3,277,601 A | 10/1966 | Ryan |
| 3,319,846 A | 5/1967 | Wolf |
| 3,350,812 A | 11/1967 | Lindsay et al. |
| 3,361,310 A | 1/1968 | Ziegler et al. |
| 3,425,155 A | 2/1969 | Ryan et al. |
| 3,466,793 A | 9/1969 | Pugh et al. |
| 3,557,471 A | 1/1971 | Payne et al. |

(List continued on next page.)

FOREIGN PATENT DOCUMENTS

| | | |
|---|---|---|
| EP | 0250063 | 11/1987 |
| JP | 62050112 | 3/1987 |
| JP | 2129076 | 6/1987 |
| JP | 62246392 | 10/1987 |

OTHER PUBLICATIONS

"Skipper" doll (Exhibit A).
1994 "G.I. Joe" doll (Exhibit B).
1978 "G.I. Joe" doll (Exhibit C).
Babe Ruth figure.
G.I. Joe figure.
Barbie figure.
"He–Man" figure.
"Marshall Bravestarr" figure.
"Handle Bar" figure.

*Primary Examiner*—Derris H. Banks
*Assistant Examiner*—Jamila Williams
(74) *Attorney, Agent, or Firm*—Michael Best & Friedrich

(57) ABSTRACT

A toy figure having multiple articulating limbs connected to the torso by pivot joints that are molded in a vertical injection molding step that forms and pivotally interconnects, in situ, one member of the pivot joint to a second, pre-formed member of the pivot joint.

2 Claims, 7 Drawing Sheets

U.S. PATENT DOCUMENTS

| | | | |
|---|---|---|---|
| 3,591,669 A | 7/1971 | Memory | |
| 3,609,911 A | 10/1971 | Hanf et al. | |
| 3,628,282 A | 12/1971 | Johnson et al. | |
| 3,699,710 A | 10/1972 | Glass et al. | |
| 3,716,942 A | 2/1973 | Garcia et al. | |
| 3,727,343 A | 4/1973 | Chiari | |
| 3,740,894 A | 6/1973 | Howland et al. | |
| 3,866,350 A | * 2/1975 | Goldfarb et al. | 46/161 |
| 3,900,992 A | * 8/1975 | Klamer | 46/161 |
| 3,938,277 A | 2/1976 | Goldfarb et al. | |
| 3,940,880 A | * 3/1976 | Kaelin et al. | 46/161 |
| 3,941,495 A | 3/1976 | Duncan | |
| 3,955,311 A | 5/1976 | Lyons et al. | |
| 3,988,855 A | 11/1976 | Crabtree et al. | |
| 4,006,555 A | 2/1977 | England et al. | |
| 4,242,830 A | 1/1981 | Hauser | |
| 4,274,224 A | 6/1981 | Pugh et al. | |
| 4,279,099 A | 7/1981 | Dyer et al. | |
| 4,279,419 A | * 7/1981 | Barnes et al. | 273/87.4 |
| 4,290,181 A | 9/1981 | Jackson | |
| 4,439,909 A | 4/1984 | Borgen et al. | |
| 4,470,784 A | 9/1984 | Piotrovsky | |
| 4,579,542 A | 4/1986 | Mayer et al. | |
| 4,619,540 A | 10/1986 | Day et al. | |
| 4,643,691 A | 2/1987 | Keiji | |
| 4,669,998 A | 6/1987 | Amici et al. | |
| 4,673,374 A | 6/1987 | Kelley | |
| 4,680,019 A | 7/1987 | Baerenwald et al. | |
| 4,696,656 A | * 9/1987 | Torres et al. | 446/384 |
| 4,708,687 A | 11/1987 | Goldberg et al. | |
| 4,738,649 A | 4/1988 | Delli Bovi et al. | |
| 4,790,789 A | 12/1988 | Mathis | |
| 4,854,911 A | 8/1989 | Berliner et al. | |
| 4,887,486 A | 12/1989 | Wood, Jr. | |
| 4,902,220 A | 2/1990 | Nakagawa | |
| 4,973,372 A | 11/1990 | Ditlinger | |
| 4,995,846 A | 2/1991 | Mariol | |
| 5,009,538 A | 4/1991 | Shirai et al. | |
| 5,011,320 A | 4/1991 | Love et al. | |
| 5,011,321 A | 4/1991 | Kidokoro | |
| 5,078,531 A | 1/1992 | Sakai et al. | |
| 5,140,869 A | 8/1992 | Mrdjenovich et al. | |
| 5,150,981 A | 9/1992 | Miwa | |
| 5,152,628 A | 10/1992 | Broszat et al. | |
| 5,163,769 A | 11/1992 | Dresselhouse | |
| 5,178,482 A | 1/1993 | Wood | |
| 5,257,873 A | 11/1993 | Abbat | |
| 5,267,805 A | 12/1993 | Ueno et al. | |
| 5,277,860 A | 1/1994 | Sinclair | |
| 5,334,073 A | 8/1994 | Tilbor et al. | |
| 5,431,554 A | 7/1995 | Yoshida et al. | |
| 5,588,895 A | 12/1996 | Larson | |
| 5,615,967 A | 4/1997 | Hellon | |
| 5,989,658 A | 11/1999 | Miura et al. | |
| 6,033,284 A | 3/2000 | Ferre | |
| 6,375,536 B1 | * 4/2002 | Yang | 446/353 |

\* cited by examiner

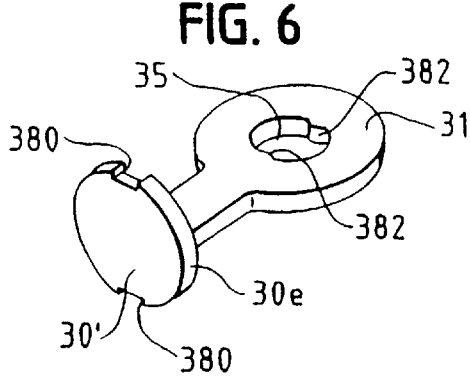
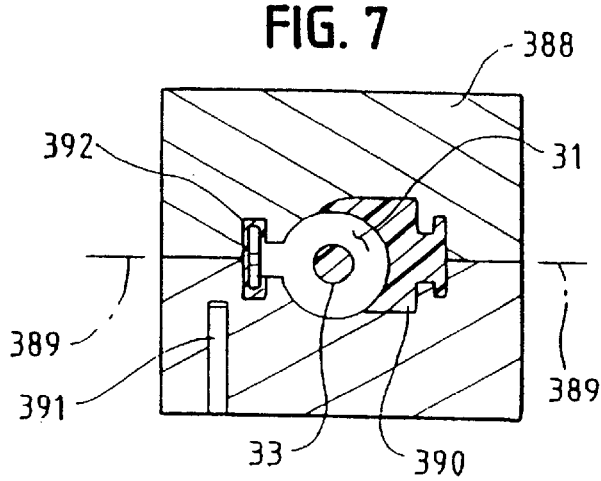
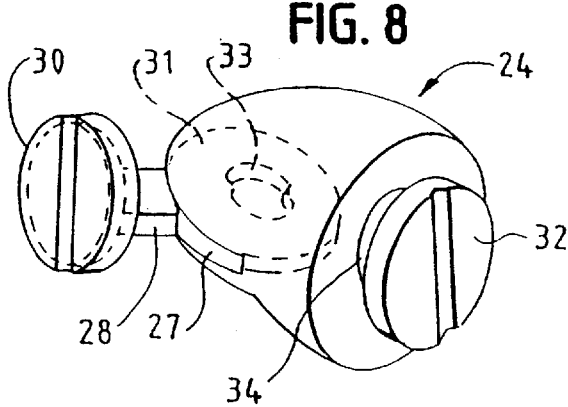
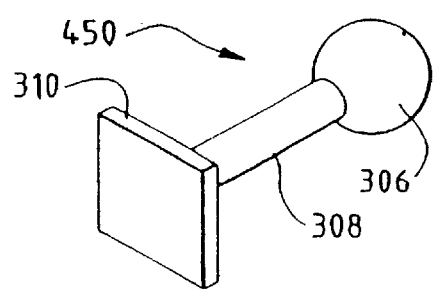
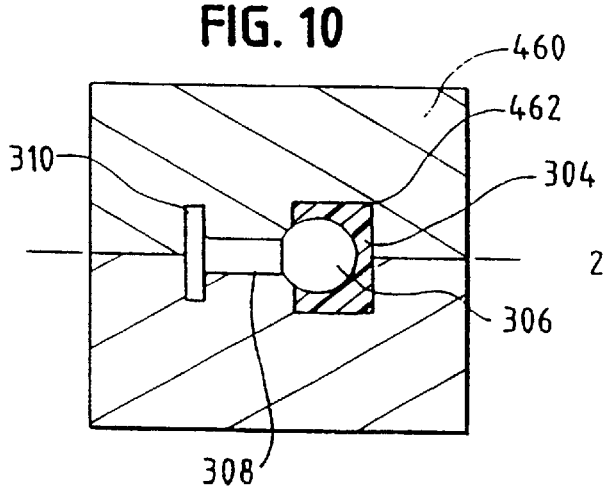
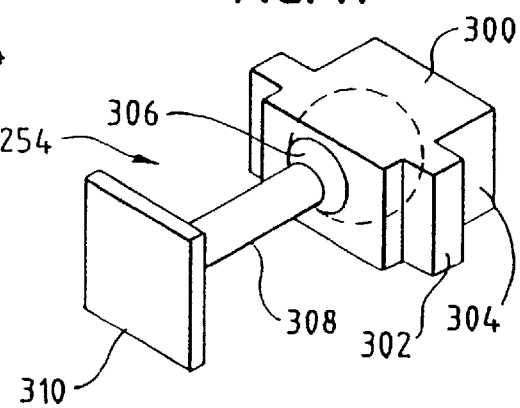

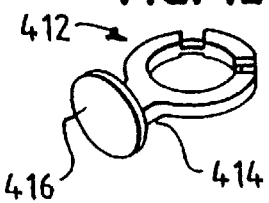
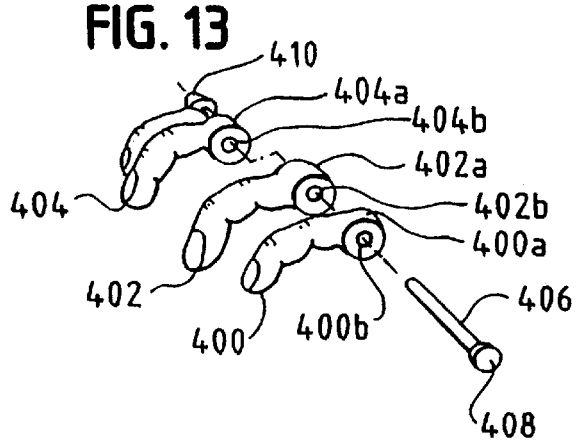
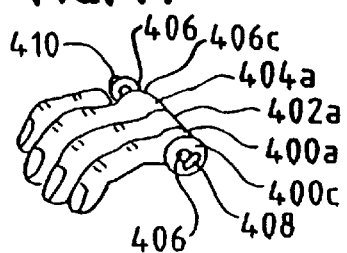
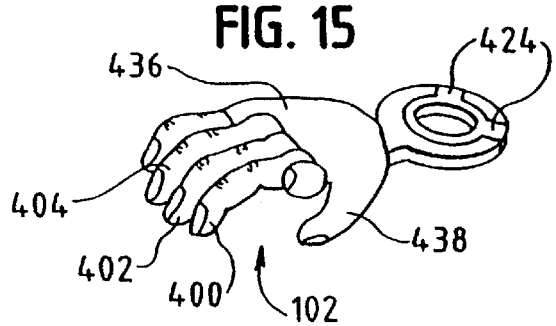
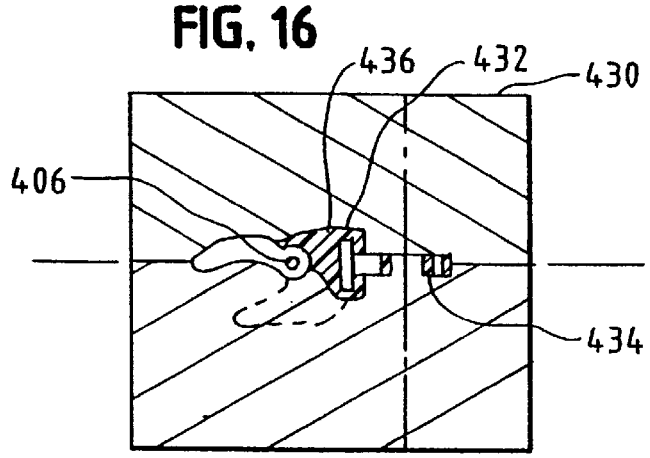

TOY FIGURE WITH ARTICULATING JOINTS

This application is a division of application Ser. No. 09/088,385, filed on Jun. 1, 1998.

FIELD OF THE INVENTION

The present invention generally relates to jointed toy figures and more specifically relates to toy figures with an unusually large number of unique articulating parts which give the figures a particularly realistic look and feel.

BACKGROUND OF THE INVENTION

Toy figures with articulating limbs are generally known. Toy figures having a large number of articulating limbs are not widely available because of expenses associated with manufacturing and assembling the completed toy figure. Additionally, as the toy figures decrease in size below about 10–12 inches in overall length, the costs of manufacture and assembly increase considerably because of difficulty in constructing and attaching small limbs with multiple movable joints. A further problem in providing relatively small toy figures with multiple articulating parts concerns producing small joints that are durable and have the close tolerances necessary to provide sufficient friction between the moveable surfaces of the joints necessary for proper operation of the joints. Also, it has long been a goal to combine realistically articulating limbs with adjacent body parts in a manner which minimizes any undesirable gaps so that the outer surface of the articulating figure has a relatively continuous, life-like appearance.

It would therefore be very desirable to provide a toy figure with multiple articulating limbs having improved joint construction with increased durability for manipulation through a variety of realistic poses. It would also be desirable to provide methods which reduce the amount of time and labor needed for assembling toy figures of various sizes, including small sizes, having articulating limbs. It would also be very desirable to provide toy figures, especially toy figures with an overall length less than about 10 inches, that provide improved joint operation. Furthermore, it would be very desirable to enable the manufacture of toy figures with realistic articulating limb and torso parts having outer surfaces free of screws or other visible fasteners and having reduced gaps between the connected parts.

SUMMARY OF THE INVENTION

The present invention provides toy figures having articulating limbs with a large number of joints. The toy figures of the present invention include one or more pivotally connected parts having a first joint member made of a first material, preferably a first thermoplastic material, and a second joint member made of a second thermoplastic which has a melting point that is less than that of the first material. The first and second joint members are advantageously pivotally connected to one another in an in situ injection molding method of the invention. Thus, in another of its aspects, the present invention includes a method of connecting a first joint member and a second joint member in an in situ injection molding process, wherein the first joint member is formed of a first material and the second joint member is formed of a second material which is a thermoplastic material, wherein the first joint member is inserted in a predetermined position into an injection mold, as an insert part, and the second thermoplastic composition is injected to form the second joint member around the first joint member, pivotally connecting the two. In a presently preferred embodiment, the first thermoplastic composition is an acrylonitrile butadiene styrene (ABS) and the second thermoplastic composition is a polyvinylchloride (PVC) composition having a melting point of about 160° C. and the difference in melting points is at least about 70° C.

BRIEF DESCRIPTION OF THE DRAWINGS

FIG. 6 is a perspective view of a first joint member used as an insert part in the in situ injection molding process, wherein the insert part is pivotally connected to a second joint member to form the pivoting left shoulder of the toy figure of FIG. 1;

FIG. 7 is an elevation view of the insert part of FIG. 8 in conjunction with the second joint member, including a pivot pin, as formed in an injection mold, with part of the mold cut away for purposes of illustration;

FIG. 8 is a perspective view of the pivotally connected first and second joint members made by injection molding, as in FIG. 7, showing in phantom lines the position and connection of the insert part (first joint member) depicted in FIG. 6;

FIG. 9 is a perspective view of an insert part which provides the ball member of a ball and socket joint of the invention which corresponds to the body joint of the toy figure of FIG. 1;

FIG. 10 is an elevation view of the insert part of FIG. 9 in conjunction with a socket member, as formed in an injection mold, with part of the mold cut away for purposes of illustration;

FIG. 11 is a perspective view of the ball and socket joint made by injection molding, as in FIG. 10, showing in phantom lines the position and connection of the insert part (first joint member) depicted in FIG. 9 to the body of the socket member (second joint member) of the ball and socket joint;

FIG. 12 is a perspective view of an insert part used in the hand/wrist of the toy figure of FIG. 1;

FIG. 13 is an exploded perspective view of the finger members and pivot pin used (in combination with the insert part of FIG. 12) to form a left hand according to a method of the present invention;

FIG. 14 is a perspective view of the finger members of a left hand of a figure of the present invention with the finger members pivotally mounted on a pivot pin prior to the injection molding step to complete the left hand;

FIG. 15 is a perspective view of a left hand of the toy figure of the FIG. 1 made by a molding method of the present invention; and FIG. 16 is an elevation view of the insert parts of FIGS. 12 and 14 in conjunction with a left hand of the toy figure of the present invention, as formed in an injection mold, with part of the mold cut away for purposes of illustration.

DETAILED DESCRIPTION OF THE INVENTION

Figure 1:
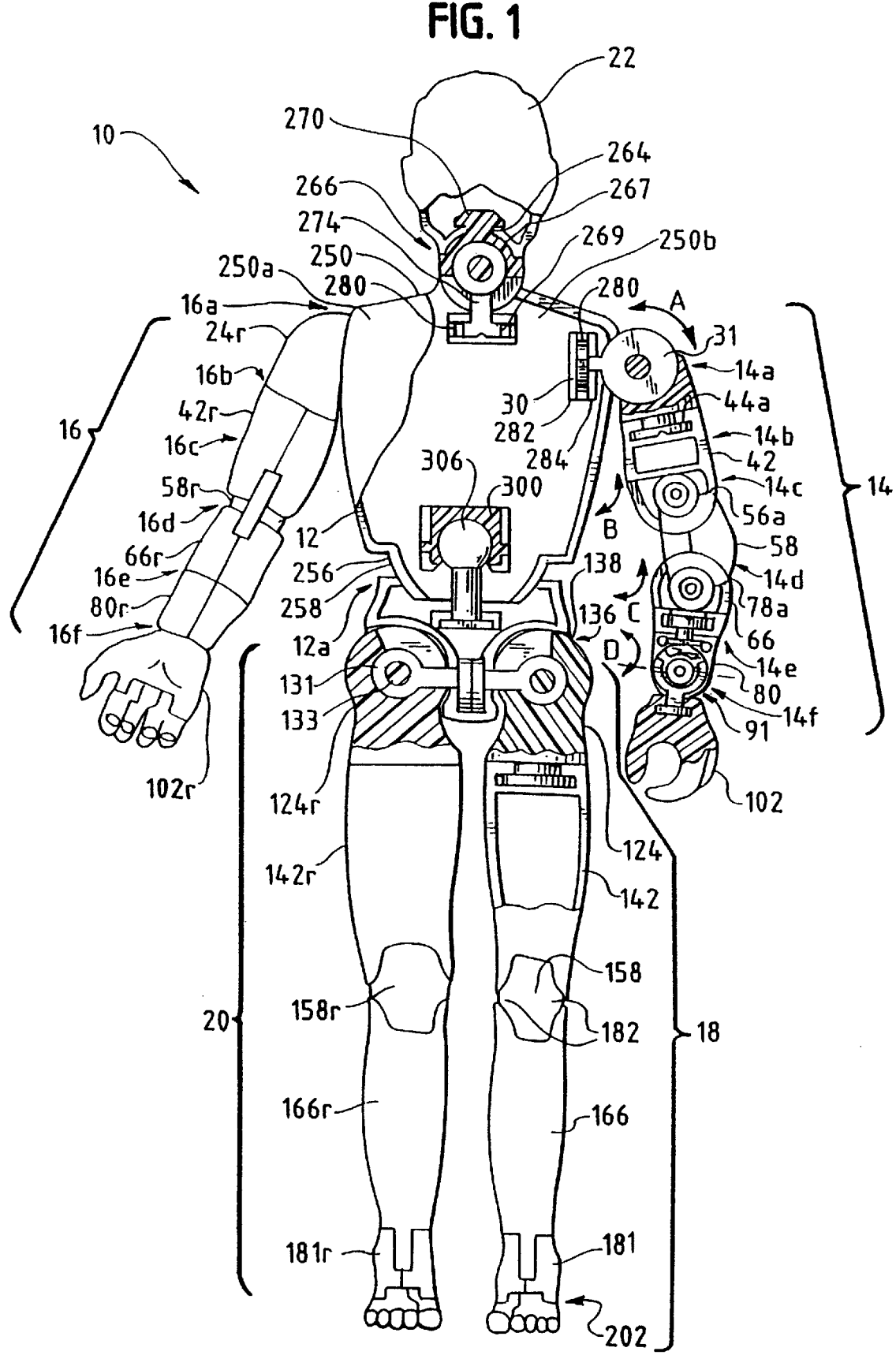
FIG. 1 is a front elevation view, partially in cross-section, depicting a toy figure having features of the present invention.

Reference is made to FIG. 1 of the drawings which depicts a toy figure designated by reference numeral 10. Toy FIG. 10 includes a torso 12 and limbs including a left arm 14, a right arm 16, a left leg 18, and a right leg 20, as well as a head 22.

Left arm 14 and right arm 16, which are shown in different orientations in FIG. 1, comprise a plurality of arm segments designated by numerals 24, 42, 58, 66, 80 and 102. These arm segments are interconnected at joints 14a, b, c, d, e and f and 16a, b, c, d, e and f, respectively, to provide articulating left and right arms 14 and 16. Since the two arms 14 and 16 and the two legs 18 and 20, as well as the component parts thereof, are mirror-images of each other, we will describe the details of left arm and left leg 14 and 18, it being understood that the corresponding right arm and right leg 16 and 20 are comprised and assembled identically.

Figure 2:
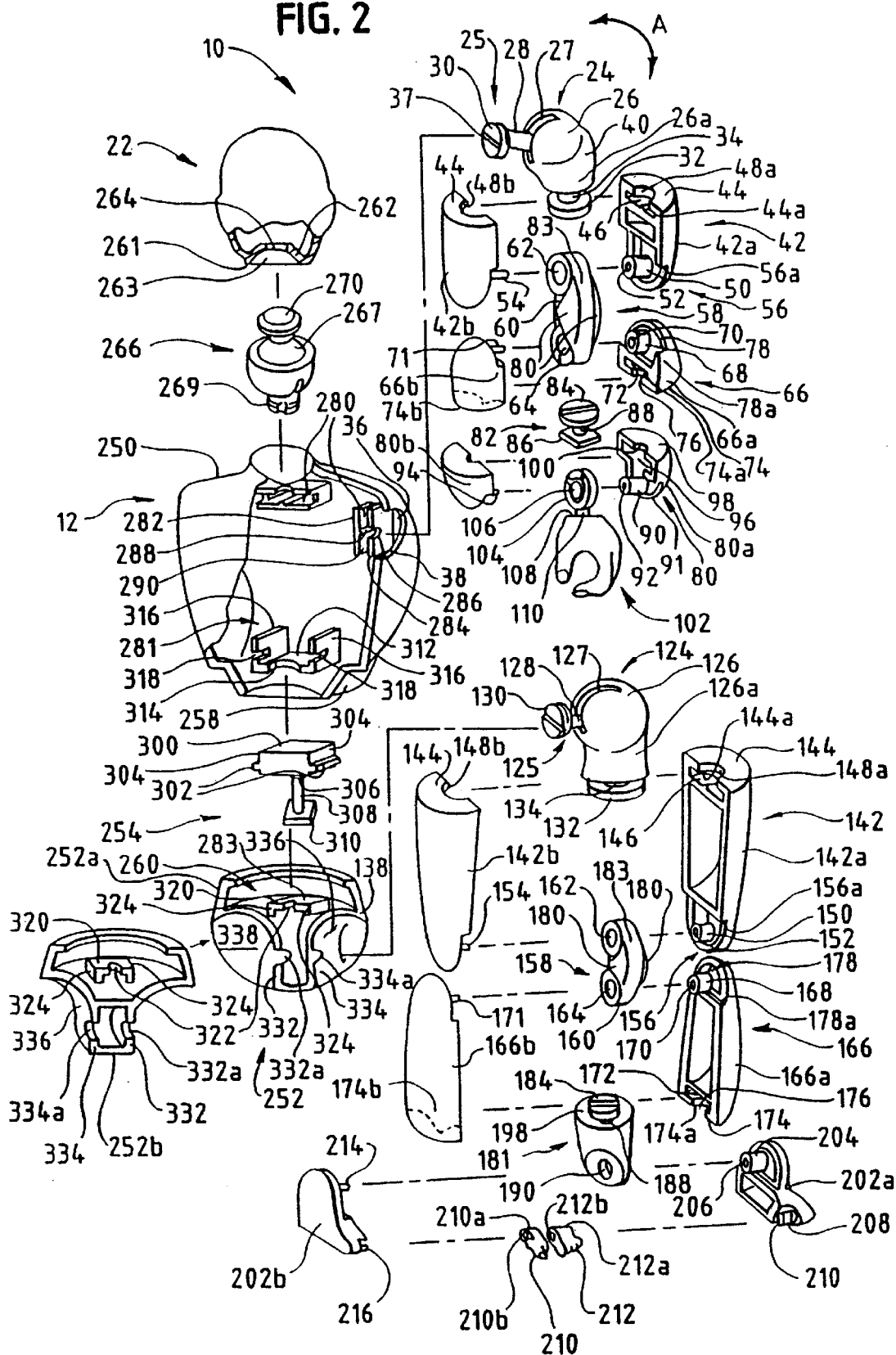
FIG. 2 is an exploded perspective view of the toy figure of FIG. 1 illustrating the head, torso and left limbs of the toy figure, it being understood that the right limbs are corresponding mirror-images of the left limbs.

With reference to FIGS. 1 and 2, first arm segment 24 has a generally spherical top portion 26 with a short trunk 26a depending therefrom and integrally formed therewith to give the appearance of a left shoulder and approximately the upper ⅓ of the upper arm. Spherical body 26 has an arcuate opening 27 into the interior of first arm segment 24. A joint member 25 having a lever arm 28 is pivotally attached to first arm segment 24 at joint 14a. Lever arm 28 terminates at one end in a disk 30 and at the other end in a ring 31 Ring 31 has a bore for mounting joint member 25. Ring 31 of lever arm 28 extends through arcuate opening 27 and is pivotally mounted on pivot pin 33 formed in the first arm segment as described below.

This mounting of joint member 25 inside trunk 12 permits first arm segment 24 to pivot at joint 14a through an arc A of approximately 90°. Thus, when first arm segment 24 is mounted to trunk 12, as described more fully below, arm segment 24 is capable of pivoting within the arm hole 36 of the trunk such that the gap between the outer surface of body 26 of the first arm segment and the circular edge 38 of arm hole 36 is small at all positions of first arm segment 24 along arc A.

First arm member 24 further comprises a disk 32 spaced apart from a bottom surface of body 26a by a short shaft 34, by way of which first arm segment 24 is rotatingly connected to second arm segment 42. As best seen in FIG. 2, second arm segment 42 has complementary second arm segment shells 42a and 42b which are attached by way of a cylindrical pin 50 in second arm segment shell 42a having a bore 52 therein for receiving assembly pin 54 extending from the inside surface of second arm shell 42b. When these second arm segment shells are assembled, disk 32 of the first arm segment is seated in a corresponding circular interior space 46 with shaft 34 extending through a bore in top wall 44 of second arm segment 42, the bore being formed by complementary semi-circular cut-outs 48a and 48b in top wall 44. With disk 32 positioned in interior space 46 and resting against the interior surface 44a of top wall 44, second arm segment 42 is capable of rotating 360° about the axis of shaft 34 at joint 14b with respect to first arm segment 24. Additionally, second arm shell 42 has an arcuate opening 56 extending along the curved body surface of second arm segment 42 adjacent pin 50 which permits movement at joint 14c, as explained below.

Left arm 14 further comprises a third arm segment 58 which acts as a double pivot member comprising. Third arm segment 58 has a plate 60 with bores 62 and 64 extending transversely therethrough at the opposite ends of the plate. Third arm segment 58 is connected through bore 62 to pin 50 in second arm segment 42 to provide joint 14c, a pivot joint.

Left arm 14 further includes a fourth arm segment 66 which is pivotally connected to third arm segment 58 at joint 14d. Fourth arm segment 66 comprises complementary fourth arm segment shells 66a and 66b. Fourth arm segment shell 66a is provided with a pivot pin 68 which passes through bore 64 to provide pivoting motion. Pin 68 has a bore 70 therein to mate with complementary assembly pin 71 in fourth arm segment shell 66b. As will be appreciated from an inspection of FIGS. 1 and 2, fourth arm segment 66 is analogous in structure and function to second arm segment 42, albeit shorter in overall length and inverted with respect to the orientation of second arm segment 42. Thus, fourth arm segment 66 has a circular interior space 72 (analogous to circular interior space 46) and a bottom wall 74 defining semi-circular cut outs 74a and 74b defining a bore 76 in communication with interior space 72.

Fourth arm segment 66 thus is connected to third arm segment 58 by inserting pin 68 through bore 64 of the third arm segment 58 to provide joint 14d. Thus it will be appreciated that third arm segment 58 provides a double pivot member which allows second arm segment 42 and fourth arm segment 66 to independently pivot with respect to third arm segment 58 at joints 14c and 14d, respectively.

When the second arm segment and fourth arm segment are pivoted toward each other, each of the respective arm segments are capable of pivoting through an arc of about 90° (represented by B and C) such that the second and fourth arm segments may be pivoted a total of approximately 180° with respect to one another with the third arm segment thus functioning as an elbow joint. Because the third arm segment 58 uses a double pivot arrangement whereas a natural human elbow joint has a single pivot point, the second and fourth arm segments are spaced apart from each other.

As best seen in FIG. 1, when left arm 14 is fully extended lengthwise, third arm segment 58 abuts end wall 56a of arcuate opening 56 in the bottom of second arm segment 42 and end wall 78a defining arcuate opening 78 of the fourth arm segment to provide a continuous outer arm surface. Third arm segment 58 is provided with wing like extensions 80 which extend outwardly and curve slightly downwardly from the outer edge 83 to fill in the gaps caused by the pivotal attachment of second and fourth arm segments 42 and 66 at opposite ends of third arm segment 58, as needed to assure that articulating left arm 14 has a full range of motion about third arm member 58. The wing-like extensions thus allow arm 14 to exhibit a relatively continuous outer arm surface where second and fourth arm segments 42 and 66 are joined to third arm segment 58 without interfering with the pivoting arm segments.

Left arm 14 further comprises a fifth arm segment 80 which is rotatingly connected to fourth arm segment 66 at joint 14e by lower arm joint member 82. Joint member 82 comprises a disk 84 and a plate 86 spaced apart from each other by a short shaft 88. Fifth arm segment 80 comprises complementary shells 80a and 80b having a pivot pin 90 with a bore 92 therein with complementary fifth arm segment shell 80b having an assembly pin 94 extending therefrom to fit within bore 92. Fifth arm segment 80 also has a circular interior space 96 and a top wall 98 with a bore 100 therethrough in communication with interior space 96. As will be appreciated from an inspection of FIGS. 1 and 2, fifth arm segment 80 and fourth arm segment 66 are essentially identical in structure and operation but are of different respective dimensions. When fourth and fifth arm segments 66 and 88 are rotatingly connected at joint 14e by lower arm joint member 82. fourth and fifth arm segments 66 and 80 are mated at their respective walls 74 and 98 with shaft 88 extending through bores 76 and 100 and with disk 84 seated on the interior surface of wall 74 and plate 86 seated on the interior surface of wall 98. Thus fourth and fifth arm segments 66 and 80 are capable of rotating with respect to one another 360° about shaft 88, with disk 84 rotating in interior space 72.

Left hand 102, which is discussed in detail below, includes a ring 104 with a central bore 106. Ring 104 is spaced apart from the bottom wall 108 of left hand 102 by shaft 110. Left hand 102 is pivotally connected at joint 14f to fifth arm segment 80 by way of the mounting of ring 104 on pivot pin 90, with shaft 110 extending through an arcuate opening 91 in arm segment 80. Left hand 102 therefore pivots on pivot pin 90.

Left leg 18 comprises a plurality of leg segments which are interconnected at a series of joints to provide the articulating leg whose structure and movement correspond to arm 14 described above. Thus, leg 18 comprises first, second, third, fourth and fifth leg segments 124, 142, 158, 166, and 180 which are analogous to the left arm segments 24, 42, 58, 66 and 80, as well as to the right arm segments 24r, 42r, 58r, 66r and 80r and right leg segments 124r, 142r, 158r, 166r and 180r.

With reference to FIGS. 1 and 2, first leg segment 124 has a generally spherical top portion 126 with a short trunk 126a depending therefrom and integrally formed therewith to give the appearance of a left hip and approximately the upper ⅓ of the upper leg. Spherical body 126 has an arcuate opening 127 into the interior of first leg segment 124. A joint member 125 having a lever leg 128 is pivotally attached to first leg segment 124 at joint 18a. Lever arm 128 terminates at one end in a disk 130 and at the other end in a ring 131. Ring 131 has a bore for mounting joint member 125. Ring 131 of lever leg 128 extends through arcuate opening 127 and is pivotally mounted on pivot pin 133 formed in the first leg segment as described below.

This mounting of joint member 125 inside trunk 12 permits first leg segment 124 to pivot at joint 18a through an arc D of approximately 90°. Thus, when first leg segment 124 is mounted to trunk 12, as described more fully below, leg segment 124 is capable of pivoting with respect to trunk 12 such that the gap between the outer surface of body 126 of the first leg segment and the circular edge 138 of leg hole 136 is small at all positions of first leg segment 124 along arc D.

First leg member 124 further comprises a disk 132 spaced apart from a bottom surface of body 126a by a short shaft 134, by way of which first leg segment 124 is rotatingly connected to second leg segment 142. As best seen in FIG. 2, second leg segment 142 has complementary second leg segment shells 142a and 142b which are attached by way of a cylindrical pin 150 in second leg segment shell 142a having a bore 152 therein for receiving assembly pin 154 extending from the inside surface of second leg shell 142b. When these second leg segment shells are assembled, disk 132 of the first leg segment is seated in a corresponding circular interior space 146 with shaft 134 extending through a bore in top wall 144 of second leg segment 142, the bore being formed by complementary semi-circular cut-outs 148a and 148b in top wall 144. With disk 132 positioned in interior space 146 and resting against the interior surface 144a of top wall 144, second leg segment 142 is capable of rotating 360° about the axis of shaft 134 at joint 18b with respect to first leg segment 124. Additionally, second leg shell 142 has an arcuate opening 156 extending along the curved body surface of second leg segment 142 adjacent pin 150 which permits movement at joint 18c, as explained below.

Left leg 18 further comprises a third leg segment 158 which acts as a double pivot member comprising. Third leg segment 158 has a plate 160 with bores 162 and 164 extending transversely therethrough at the opposite ends of the plate. Third leg segment 158 is connected through bore 162 to pin 150 second leg segment 142 to provide joint 18c, a pivot joint.

Left leg 18 further includes a fourth leg segment 166 which is pivotally connected to third leg segment 158 at joint 18d. Fourth leg segment 166 comprises complementary fourth leg segment shells 166a and 166b. Fourth leg segment shell 166a is provided with a pivot pin 168 which passes through bore 164 to provide pivoting motion. Pin 168 has a bore 170 therein to mate with complementary assembly pin 171 in fourth leg segment shell 166b. As will be appreciated from an inspection of FIGS. 1 and 2, fourth leg segment 166 is analogous in structure and function to second leg segment 142, albeit slightly shorter in overall length and inverted with respect to the orientation of second leg segment 142. Thus, fourth leg segment 166 has a circular interior space 172 (analogous to circular interior space 146) and a bottom wall 174 defining semi-circular cut outs 174a and 174b (shown with phantom lines) defining a bore 176 in communication with interior space 172.

Fourth leg segment 166 thus is connected to third leg segment 158 by inserting pin 168 through bore 164 of the third leg segment 158 to provide joint 18d. Thus it will be appreciated that third leg segment 158 provides a double pivot member which allows second leg segment 142 and fourth leg segment 166 to independently pivot with respect to third leg segment 158 at joints 18c and 18d, respectively.

As best seen in FIG. 1, when left leg 18 is fully extended lengthwise third leg segment 158 abuts end wall 156a of arcuate opening 156 in the bottom of second leg segment 142 and end wall 178a defining arcuate opening 178 of the fourth leg segment to provide a continuous outer leg surface.

When second leg segment and fourth leg segment are pivoted toward each other, each of the respective leg segments are capable of pivoting through an arc of about 90° (analogous to arcs C and D) such that the second and fourth leg segments may be pivoted a total of approximately 180° with respect to one another with the third leg segment thus functioning as an elbow joint. Because the third leg segment 158 uses a double pivot arrangement whereas a natural human elbow joint has a single pivot point second and fourth leg segments are spaced apart from each other. To fill the gap in the outer surfaces of the second and fourth leg segments 142 and 166 where they attach to third leg segment 158, third leg segment 158 is provided with wing-like extensions 180 which extend outwardly and curve slight downwardly from the outer edge 183 of third leg member 158 to fill in the gaps between second and fourth leg segments 142 and 166 which are needed to assure that articulating left leg 18 has a full range of motion about third leg member 158. The wing-like extensions thus allow leg 18 to exhibit a relatively continuous outer leg surface where second and fourth leg segments 142 and 166 are joined to third leg segment 158.

Left leg 18 further comprises a fifth leg segment 181 which is rotatingly connected to fourth leg segment 166 at joint 18e by a disk 184 spaced apart from fifth leg segment 181 by a short shaft 188. Fifth leg segment 181 has a bore 190 extending therethrough at its lower. When fourth and fifth leg segments 166 and 188 are rotatingly connected at joint 18e by inserting disk 184 into interior space 172 of fourth leg segment 166, fourth and fifth leg segments 166 and 181 are mated at their respective walls 174 and 198 with shaft 188 extending through bores 176 and with disk 184 seated on the interior surface of wall 174. Thus fourth and fifth leg segments 166 and 181 are capable of rotating with respect to one another 360° about shaft 188, with disk 184 rotating in interior space 172.

Left foot 202 includes L-shaped left foot shells 202a and 202b. Left foot shell 202a has a pivot pin 204 having a bore 206 therein positioned at the upper portion of the "L" and a pivot pin 208 having a bore 210 therein positioned at the terminal end of the base of the L. Foot 202 further comprises large toe member 210 and smaller toe member 212, which have respective proximal ends 210a and 212a, and bores 210b and 212b extending transversely therethrough. Toe members 210 and 212 are pivotally mounted on pivot pin 206 and fifth leg segment 180 is mounted to pivot pin 204. Left foot shell 202b connects to foot shell 202 by mating assembly pins 214 and 216 which fit in bores 206 and 210.

With further reference to FIGS. 1 and 2, trunk 12 comprises an upper torso 250 and a lower torso 252 pivotally and rotatingly connected to one another at joint 12a. As best seen in FIG. 1, upper torso 250 has a reduced lower end 256 which is defined by a gently tapering wall 258 having a collar which is partially seated in upper opening 260 in lower torso 252. Upper opening 260 thus forms a substantially circular seat to meet with the reduced end 256 of upper torso 250 such that trunk 12 is capable of articulating when upper torso 250 and lower 252 are connected by body joint 254. In a particularly preferred embodiment, upper torso is capable of pivoting left to right with respect to the lower torso over an arc of about 30° (e.g., 15° to each side) of an upright position and is capable of pivoting front to back by approximately 30° (5° back and 25° forward) to simulate a range of motion about the waist of a human being. Body joint 254, which is more fully described below with reference to FIGS. 9–11, functions as a ball and socket joint.

The head 22 of toy FIG. 10 is substantially hollow and cast of a thermoplastic resin such as PVC, preferably using a rotational molding technique as known in the art. The base 261 of the head has an involuted hemispherical bottom wall 262 defining a cavity 263 with a bore 264 therethrough at the top of the hemisphere. Head 22 is attached to upper torso 250 by a head joint member 266 which has a generally spherical body with an upper portion 267 supporting a mushroom-shaped attachment member 270 which is sized and shaped to snap-fit through bore 264 and be retained within the interior space of head 22 with the upper surface 267 of head joint 266 residing in cavity 263. Joint 266 has a second attachment disk 269 (analogous to disk 30 of joint member 25) which is pivotally connected inside of joint member 266 via lever arm 274 in an analogous manner to the slot 280 connecting lever arm 25 and first arm segment 24 as discussed below. When head 22 is connected to trunk 12, head 22 is capable of pivoting about a pivot joint located in head joint 266 (analogous to the pivot joint in first arm segment 24) as well as rotating about disk 269. Thus, head 22 is capable of swiveling and nodding relative to torso 250.

Torso 250 includes slots 280 for the rotational attachment of left arm 14, right arm 16 and head 22. Attachment of left arm 14 will now be described, it being understood that right arm 16 and head 22 are similarly attached. See FIG. 4. Left arm 14 is connected to upper torso 250 at arm hole 36 by seating disk 30 within a mounting structure comprising a slot 280 defined by vertical upstanding, parallel spaced walls 282 and 284. Wall 284 has a semi-circular cut-out 286 along its exposed edge and the opposite wall 282 has a horizontal upstanding ridge 288 formed on its inner surface 290. Disk 30 of first arm member 24 is provided with a groove 37 which is complementary to ridge 288 and acts as a detent when a disk 30 is rotated within slot 280. Torso shell 250a is provided with a complementary mounting structure (not shown). Thus, when complementary upper torso shells 250a and 250b are mated edgewise, the open ends of the complementary mounting structures including particularly their respective upstanding walls abut to form a retention seat for disk 30 of first arm segment 24 with shaft 28 of arm joint 24 extending through the abutting semi-circular cut-outs 286 in the abutting wall such that left arm member 24 and thus left arm 14 is rotatingly attached to upper torso 250. A disk attached to a shaft member (e.g., disk 30 attached to shaft 28) and a retention seat (e.g., slot 280 with wall 284 having a bore therethough to rotatingly seat disk 30) are an example of complementary joint members or attachment means which comprise a rotational joint which may be used to connect adjacent body parts of toy FIG. 10.

Upper torso 250 and lower torso 252 are connected at joint 12a by a body joint member 254 having a rectilinear portion 300 with a pair of laterally-extending rails 302 extending from the side walls 304 of body 300. Body joint member 254 further comprises a ball-member 306, rotatingly and pivotally mounted in body 300 and having a shaft 308 depending therefrom and connected to a plate 310.

Portion 300 of body joint member is seated within torso 250 using a mounting structure 281 that is different than previously described for seating disk 30 of first arm segment 24 in slot 280. Thus, mounting structure 281 has a bottom wall 312 having a semi-circular cut-out 314. Bottom wall 312 is connected to a pair of upstanding parallel spaced side walls 316, which side walls have complementary rectangular cut-outs 318. Body 300 of body joint 254 is seated on bottom wall 312 with notches 318 engaging rails 302 of the body joint and shaft 308 extending through cut-out 314 and through the opening at the bottom of upper torso 250.

Lower torso 252 has yet another type of mounting structure, designated by reference numeral 283, which includes an upper plate 320 having a semi-circular cut-out 322 at its edge. Top plate 320 has a pair of parallel reinforcing side walls 324 to add structural support to top wall 320. Complementary top plate and reinforcing side plates are formed on lower torso shell 252a which complementary walls abut when the shells 252a and 252b of lower torso 252 are mated edgewise to capture plate 310 beneath top wall 320. As will be appreciated, the length of shaft 308 is predetermined so that when body 300 is seated on bottom wall 312 and plate 310 is seated beneath top wall 320, the reduced end 256 of upper torso is pivotably and rotatably seated in substantially circular opening 260 of lower torso 252.

Figure 3:
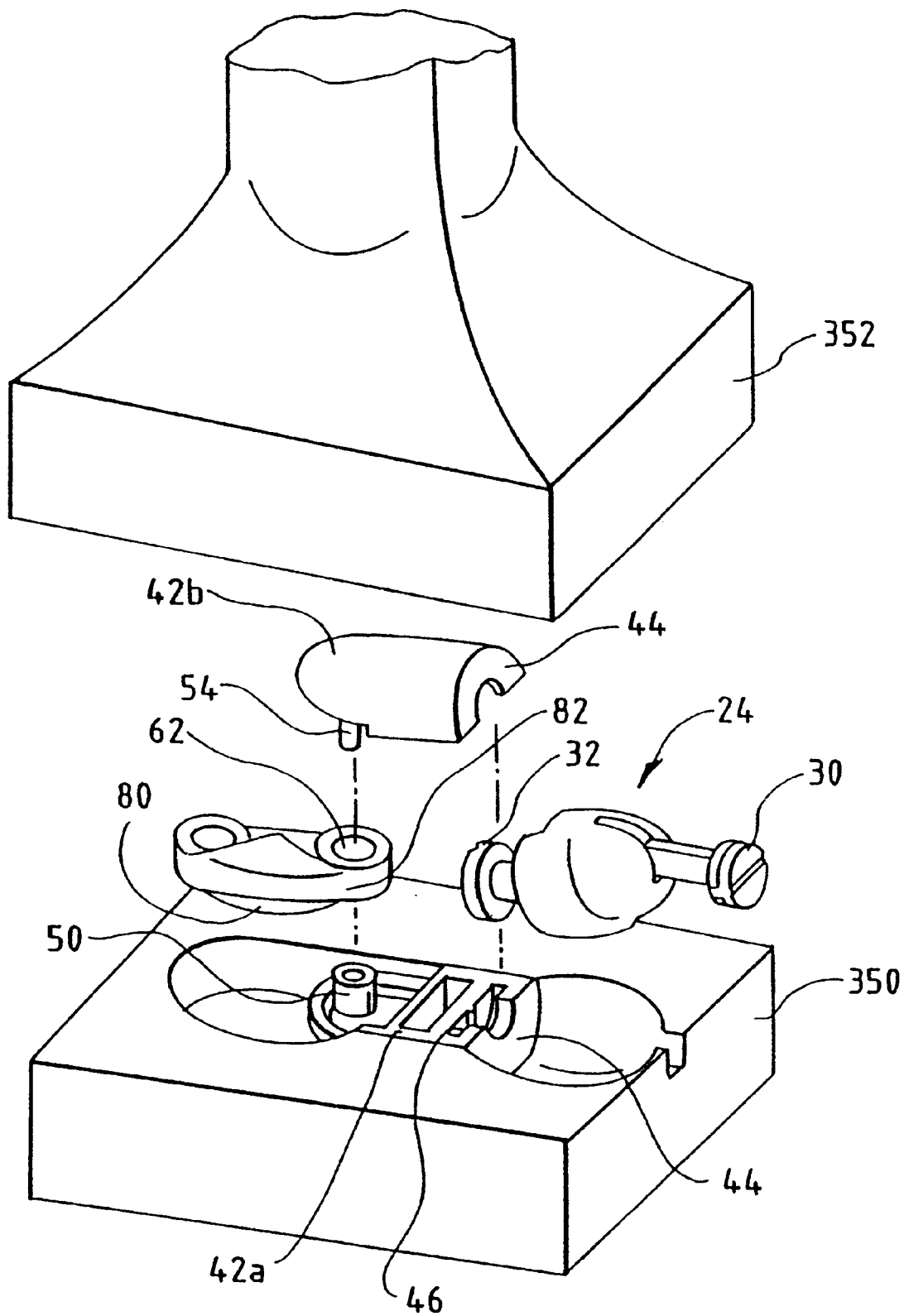
FIG. 3 is an exploded perspective view of the component parts of the toy figure of FIG. 1 which comprise a left arm subassembly extending from the shoulder to the elbow just prior to assembly and ultrasonic welding in an ultrasonic welding device as depicted in this FIG.

Turning to FIG. 3, assembly of action FIG. 10 proceeds with step-wise connection of the components of the limbs and torso of action FIG. 10 using an ultrasonic welding apparatus. The ultrasonic welding apparatus comprises base 350 and an ultrasonic horn 352 that resonates at a sufficiently high frequency, for example 20 kHz –40 kHz, with power output of from 1000 watts to about 4000 watts to heat the surfaces of parts which are housed within the ultrasonic welding apparatus and causes the surfaces of the plastic parts to be welded together edgewise. As known in the art, the duration of power of the ultrasonic welding apparatus may be controlled to assure a good weld of the intended abutting surface.

Figure 4:
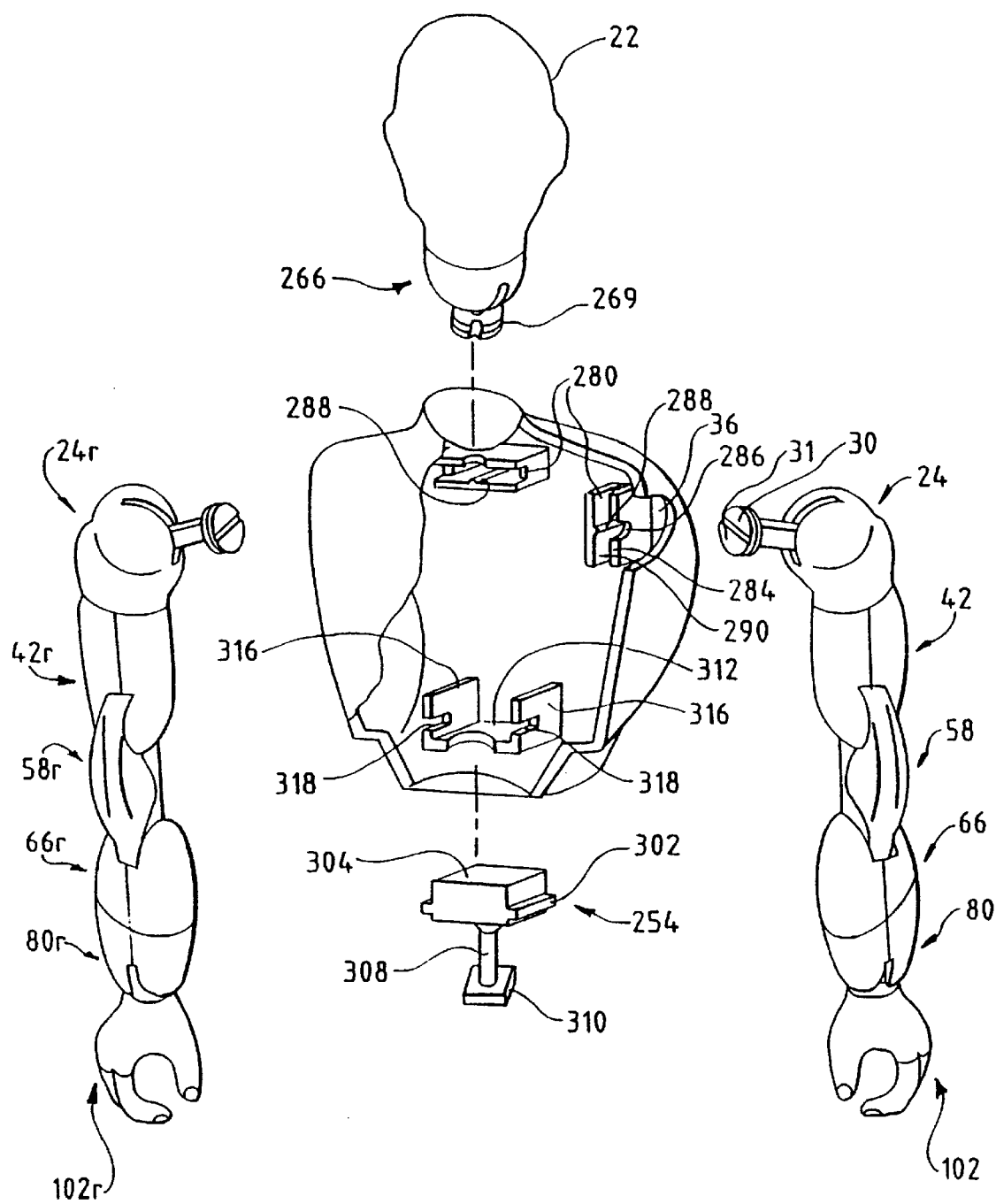
FIG. 4 is an exploded perspective view of the upper torso, head/head joint, left and right arm assemblies and the body joint of the toy figure of FIG. 1 prior to assembly and ultrasonic welding.
Figure 5:
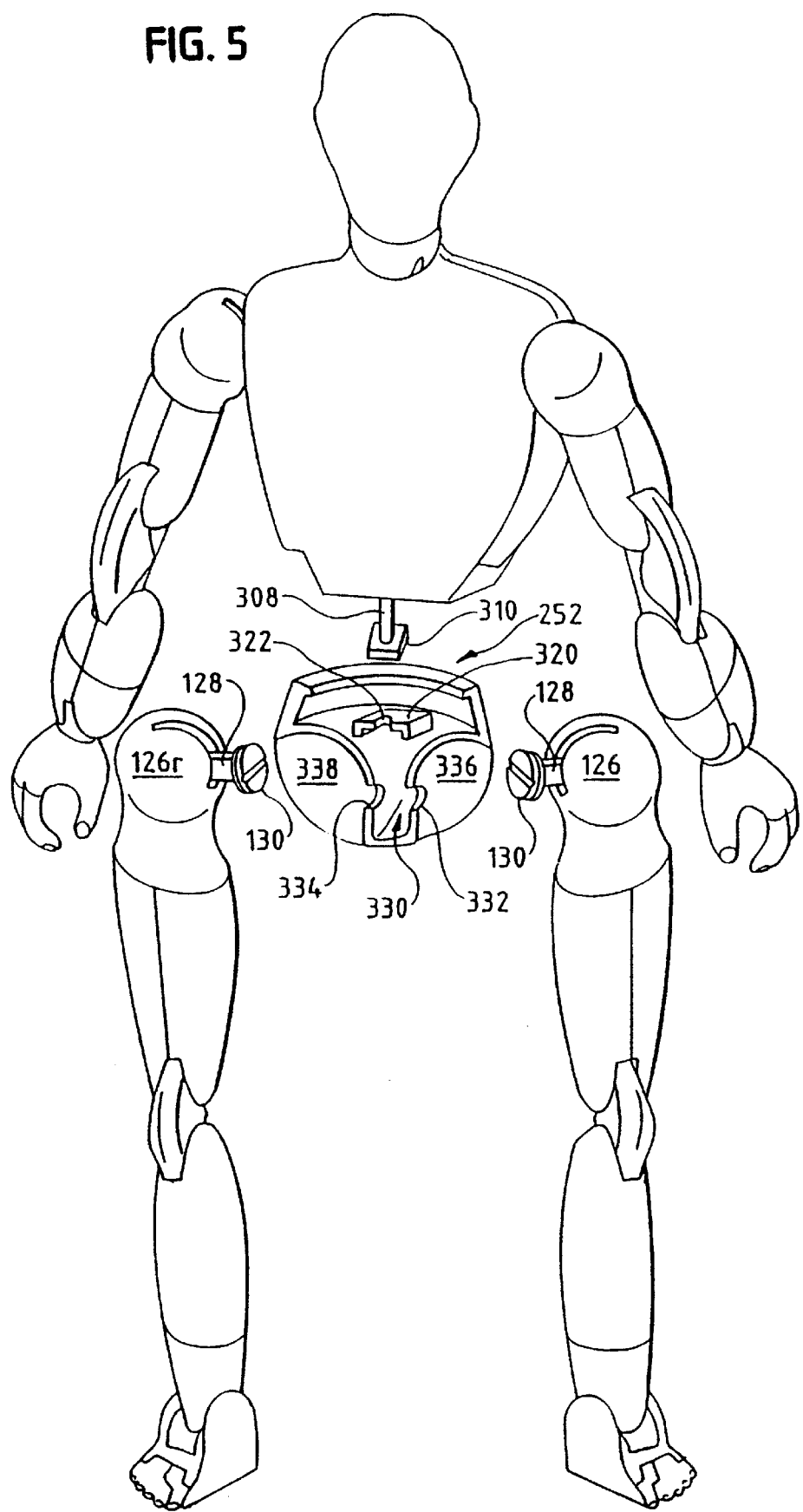
FIG. 5 is an exploded view of the upper torso produced in the assembly step depicted in FIG. 4, the lower torso, and left and right leg assemblies prior to assembly and ultrasonic welding to complete the toy figure of FIG. 1.

Referring to FIGS. 3–5, in a presently preferred embodiment of the present invention, the ultrasonic welding assembly is carried out in a series of steps to join the limb segments into articulating limb subassemblies and attach the limb subassemblies to one another to form a completed limb, and then to connect the completed limbs to the upper and lower torsos 250 and 252 and the upper and lower torsos 250 and 252 to each other.

As shown in FIG. 3, arm shell 42a is inserted into ultrasonic base 350 and connected to first arm segment 24 by inserting disk 32 into receptacle 46. Third arm segment 58 is connected to the pin 50 of arm shell 42a through the bore 62 in plate 60 and arm shell 42b is mated edgewise with complementary arm shell 42a with assembly pin 54 being received in bore 52 of pin 50. When arm shells 42a and 42b are mated, disk 32 (and thus first arm segment 24) is rotationally captured in interior space 46 of second arm segment 42 and third arm segment 58 is captured and pivotally mounted on pivot pin 50 of second arm segment 42. Then, ultrasonic energy is applied to weld arm shells 42a and 42b (preferably formed of ABS) edgewise without adversely affecting the above-described rotational and pivotal connections. The assembly so formed is a first left arm subassembly.

In the next step of assembling the left arm, arm shells 66a and 66b of the fourth arm segment 66 are brought together for ultrasonic welding with attaching pin 71 being received in bore 70 after connecting the first left arm subassembly (completed in the prior ultrasonic welding step) by connecting pin 68 through bore 64 of third arm segment 58 extending from the first left arm subassembly and by inserting disk 84 of lower arm joint 82 into receptacle 72. After completion of the second ultrasonic welding step, a second left arm subassembly is provided which is connected, in a third ultrasonic welding, to fifth left arm segment 80 and left hand 102. In this third ultrasonic welding step arm shells 80a and 80b are mated edgewise and welded essentially as described above to capture plate 86 of lower arm joint 82 in receptacle 96 and to capture ring 104 pivotally mounted on pin 90. After the third ultrasonic welding step the left arm 14 is complete.

The left leg is assembled in essentially the same manner using three ultrasonic welding steps as described above for assembly of the left arm. Thus, referring to FIGS. 1 and 2, in step (1), left first leg segment 124, left leg shells 142a and 142b and third left leg member 158 are joined in an ultrasonic welding step to provide a first leg subassembly; in step (2), a further ultrasonic welding step, the first leg subassembly is pivotally connected by way of bore 164 in the portion of third leg member 158, extending from the first leg subassembly to pin 168 of leg shell 166a and to fifth leg segment 181 by inserting disk 184 into a receptacle 172 to form a second leg subassembly; and in step (3), toe members 210 and 212 are pivotally mounted on pin 208 and pin 204 is pivotally mounted through bore 190 of fifth leg segment 181 and the foot shells 202a and 202b are brought together edgewise with assembly pins 214 and 216 being received in bores 206 and 210, respectively, prior to ultrasonic welding to capture second leg subassembly via bore 190 and to capture toe members 210 and 212 to complete left leg 18.

Right arm 16 and right leg 20 are assembled in the same manner as left arm 14 and left leg 18.

Referring now to FIG. 4, the left arm 14 and right arm 16 are connected to upper torso 250 by inserting disks 30 into slots 280. The head 22 (previously joined to head joint 266) is connected by inserting disk 269 into slot 280. And, body 300 of body joint 254 is seated on bottom plate 312 with rails 302 received in notches 318 of side plates 316. Then upper torso shells 250a and 250b are aligned edgewise with complementary slots located near the respective arm holes and opening at the top and bottom of the torso for the head joint 266 and body joint 254 abutting to capture disks 30 (arms 14 and 16) and 269 (head 22) and rails 302 (body joint 254), followed by ultrasonic welding to provide an upper torso 250 having a left arm 14, a right arm 16, a head 22 and a body joint 254.

With reference to FIG. 5, the leg assemblies and lower torso are attached to the completed upper torso (1) by seating plate 310 beneath upper wall 320 so that shaft 308 extends through semi-circular cut-out 322, and (2) by positioning disks 130 in the interior space 330 defined by lower torso walls 332 and 334 with shafts 128 extending through cut-outs 332 and 334 of lower torso 252. In this orientation, the spherical outer walls 126 and 126r of first leg segment 124 and 124r are flush against the concave sidewalls 336 and 338 of lower torso 252. Then lower torso shells 252a and 252b are mated edgewise and connected by ultrasonic welding to capture upper torso 250 and left and right legs 18 and 20, thereby completing the assembly of action FIG. 10.

In yet another of its aspects, the present invention entails an injection molding method for producing a joint in which a first joint member is pivotally connected to a second joint member. This method comprises the steps of:

(i) inserting a first joint member having a first portion with a substantially circular bore into an injection mold having inner walls defining a cavity for forming at least the second joint member, so that the first joint member is positioned in the injection mold so that the first portion is maintained in spaced relation to the walls of the mold and a second portion of the first joint member is outside of the mold cavity; and (ii) injecting a thermoplastic composition into the cavity of the mold under suitable injection molding conditions so that the thermoplastic composition fills the cavity and engulfs the first portion of the first joint member and fills the bore to form in situ a joint including a second joint member with a molded-in-place pivot pin pivotally connecting the first joint member to the second joint member, wherein the injecting step is carried out under injection molding conditions that do not adversely affect the shape and structural integrity of the first joint member.

In another of its aspects, the present invention entails an injection molding method for making a ball and socket joint for pivotally connecting a first joint member to a second joint member comprising the steps of:

(i) inserting a joint member having a first portion with a substantially spherical ball member into an injection mold having inner walls defining a cavity for forming at least the second joint member, the first joint member is positioned in the injection mold so that the major portion of the ball member is maintained in spaced relation to the walls of the mold and a minor portion of the ball member of the first joint member is outside of the mold cavity; and (ii) injecting a thermoplastic composition into the cavity of the mold under suitable injection molding conditions so that the thermoplastic composition fills the cavity and engulfs the major portion of the ball member of the first joint member to form the second joint member including a socket pivotally connecting the first joint member to the second joint member, wherein the injecting step is carried out under injection molding conditions that do not adversely affect the first joint member.

The term "suitable injection molding conditions" means temperature, time and pressure conditions as known in the art which allow a flowable thermoplastic composition to be introduced into the cavity of an injection mold so as to fill the cavity. As will be appreciated by those of ordinary skill in the art, such suitable injection molding conditions may be routinely determined depending upon the selected thermoplastic material. Also, by the phrase "injection molding conditions that do not adversely affect the first joint member," it is meant temperature, time and pressure conditions less than those which would cause either the first joint member having a bore therethrough or the first joint member comprising a ball member of a ball and socket joint, to melt, distort or fuse to the second joint member so that the first and second joint members are unable to pivot properly with respect to each other.

In the methods of the present invention for pivotally connecting a first joint member to a second joint member, it is preferred to use a vertical injection machine because of the relative ease with which an insert part may be oriented and held in the mold during the molding process. However, other injection molding apparatus, including conventional horizontal injection molding machines, may be used with suitably designed molds.

In the injection molding process of the invention, a first rigid joint member is made of a first material which has a higher melting point than the second joint member. The first material may be any suitable material for an insert part including plastic, metal or the like, so long as the first material has a melting point sufficiently above the melting point of the second thermoplastic material used in the claimed process. It is presently preferred, however, that both the first joint member and the second joint member be made of first and second thermoplastic materials, respectively. Also, it is preferred that the first joint member be injection molded.

In a particularly preferred embodiment, the first thermoplastic material will have a melting temperature that is at least about 30° C. higher than the second thermoplastic material. The first thermoplastic composition more preferably will have a melting point which is from about 50° C. to about 300° C. higher than the second thermoplastic material, and most preferably about 70° C. to about 140° C. higher than that of the second thermoplastic material. Suitable first thermoplastic materials may have a melting point in the range of 200° C. to 350° C. and suitable second thermoplastic compositions may have a melting point in the range of 140° C. to 180° C. or more. Presently preferred first thermoplastic compositions include polycarbonate having a melting point of about 300° C., nylon having a melting point of about 300° C., acrylonitrile-butadiene-styrene (ABS) having a melting point of about 230° C., polyoxymethylene resin (POM), (e.g., POM known by the brand name Celcon), having a melting point of about 260° C., and the like.

Presently preferred second thermoplastic compositions include polyvinylchloride or Kraton (a brand name of styrene butadiene, a synthetic rubber composition) having a melting point of about 160° C. In particularly preferred embodiments of the invention, the first plastic composition is ABS and the second plastic composition is PVC.

It has been surprisingly found that where the second plastic composition is relatively soft compared to the first plastic composition a sufficient coefficient of friction between the first and second joint members results to permit relative movement while insuring that, once moved, the members will remain in their new relative positions. This applies as well to other pairs of joint members (including joint members formed separately and then assembled) used to form a pivot joint or a rotational joint of toy FIG. 10.

Referring to FIGS. 6–8, one embodiment of the molding method of the present invention is illustrated. FIG. 6 shows an insert piece 25' comprising ring 31 having a bore 35 transversely therethrough and a disk 30' having notches 380 cut in the circumferential edge 30e of the disk. Ring 31 and disk 30' are at either end of lever arm 28. Ring 35 has keys 382 protruding inwardly towards the center of bore 35. Keys 382 serve to increase pivotal friction between ring 31 and a pivot pin 33 formed therethrough in the molding method of the present invention. Notches 380 serve to prevent relative rotation between disk 30' and disk 30 formed over disk 30' in the molding process.

With reference to FIG. 7, first joint member 25' (preferably made of ABS) is placed in a vertical injection mold 388 which parts along line 389 so that a portion of lever arm 28 and ring 31 extend into a first cavity 390 of the mold 388 and a portion of lever arm 28 and the notched disk portion extend into a second cavity 392 of the mold 388. As shown in this figure, an intermediate portion of the lever arm is held in mold 388 so that it is not in communication with either first cavity 390 or second cavity 392. As will be understood by those skilled in the art, the second thermoplastic composition used to fill first cavity 390 and second cavity 392 is injected under injection molding conditions using runner 391, which is in communication with the first cavity and a second runner (not shown) which is in communication with the second cavity.

FIG. 8 shows the first arm segment 24 after completion of the injection molding process with a portion of ring 31 and disk 30' shown in phantom lines encased in the second thermoplastic composition used in the injection step. As best seen in FIG. 7, pivot pin 33 is formed in situ through bore 35 of ring 31.

It will be appreciated that right arm segment 24r, left leg segment 124 and first right leg segment 124r are formed in an analogous manner.

An embodiment of the molding process of the present invention for producing a ball and socket body joint 254 is illustrated in FIGS. 9–11. Body joint 254 comprises a first joint member 450 (shown in FIG. 9) and a second joint member 300 which are capable of pivoting and swiveling relative to one another. First joint member 450 includes a ball member 306 and a plate 310 spaced at either end of a shaft 308. First joint member 450 is made of a first thermoplastic composition, preferably ABS. As shown in FIG. 10, first joint member 450 is inserted into mold 460 so that a major portion of ball member 306 (at least greater than half of its surface area and preferably more than 75% of its surface area) is positioned within mold cavity 462 and a minor portion of ball member 306 (less then half of its surface area) as well as shaft 308 and plate 310 are positioned within mold 460 so that they are outside of communication with mold cavity 462. In an injection molding step, a second thermoplastic material is injected into mold cavity 462 to establish second joint member 300 which has an interior surface which is formed around the outer surface of ball 306 to establish the socket of body joint 254. FIG. 11 shows the completed body joint 254 with a major portion of ball 306 (shown in phantom lines) residing within body 300 of body joint 254.

In another of its aspects, the present invention entails a method for making a body part having pivotable digits, such as a hand 102 of a toy FIG. 10 having pivotable finger members 400, 402, and 404. Referring to FIGS. 12–16, this embodiment of the invention uses injection molding to incorporate into an articulable joint, in situ, an insert piece comprising molded finger members 400, 402, 404. These finger members are each molded of a first thermoplastic material, preferably ABS, generally in the shape of naturally-positioned, relaxed fingers. Finger members 400, 402, and 404, each of which has a proximal end 400a, 402a and 404a, with a respective bore 400b, 402b and 404b, extending transversely therethrough for receiving a pivot pin 406 on which finger members 400, 402 and 404 are pivotally mounted on the pin, as shown in FIG. 14. The pivotally mounted finger members are centered on pivot pin 136 with clearance at each end of the pin (i.e., between finger member 400 and pin head 408, and between finger member 404 and pin fastener 410). As best seen in FIGS. 13 and 14, the proximal ends of the finger members, 400a, 402a and 404a, have a combined width that is less than the length of pivot pin 406. In this configuration having the combination of finger members 400, 402 and 404 pivotally attached to pin 406 constitutes a first joint member (pivotally mounted on pin 136 to be used) as an insert part for injection molding of left hand 102. Additionally, a second insert part for injection molding of left hand is provided by wrist joint member 412 (preferably made of ABS) consisting of shaft 414 attached at one end to disk 416 and at the other end to a ring 418. Ring 418 has a bore 420 therethrough and notches 422 to prevent relative rotation of the ring with respect to bore liner 424 (made of second thermoplastic material) which is molded to the ring in an injection molding step. See also FIG. 16. Bore liner 424 increases pivotal friction achieved when hand 102 is pivotally mounted on pivot pin 90 of fourth arm segment 80 during assembly of left arm 14 to resist unintended movement of joint 14f. See FIGS. 1 and 2.

As depicted in FIG. 16, left hand 102 is completed in a vertical injection molding step wherein the exposed ends of pivot pin 406 (including head 408 and fastener 410) and wrist joint member 412 are positioned opposite each other in insert mold 430 having a first cavity 432 sized and shaped to form the body 436 of hand 102 including a thumb 438. Hand portion 436, the shape of which is defined by the shape of the mold, forms around and captures pin 406 (preferably encasing pin head 408 and fastener 410) to secure the fingers pivotally to hand 436 and also forms around shaft 414 and disk 416 of wrist joint member 412. Second cavity 434 defines the surface of bore liner 424 which is formed simultaneously with hand portion 436 to complete left hand 102 in the molding process. The injection mold 430 maintains the finger members 400, 402 and 404 outside of communication with the cavity of the injection mold so that the material used in forming hand portion 162 does not fill the areas between the finger members. The molding does, however, form flush with the exposed sides 400c and 406c of finger members 400 and 406, thereby capturing the ends of pivot pin 406 along with pin head 408 and pin fastener 410.

Applicants' foregoing description of the present invention is illustrative. Other modifications and variations will be apparent to those of ordinary skill in the art in light of applicants' specification, and such modifications and variations are within the scope of their invention defined by the following claims.

We claim:

1. A toy figure comprising:
    a head having an interior space, the head having a bottom surface with an opening therein;
    a head joint having a body member with an upper surface sized and shaped to mate with the bottom surface of the head, said head joint further comprising a joint member which extends through the opening in the bottom surface of the head to connect the head joint to the head; and
    a lever arm that is pivotally connected to the head joint, said lever arm extending from a bottom surface of the joint member and having a rotational member at its free end.

2. A toy figure according to claim 1, further comprising a pair of shells defining a torso segment having an opening therein sized and shaped to mate with the bottom surface of the head joint and having an internally formed retention seat adjacent to said opening, wherein the rotational member of the lever arm is a disk that is seated in the retention seat to rotationally mount the head joint to the torso segment.

* * * * *

UNITED STATES PATENT AND TRADEMARK OFFICE
CERTIFICATE OF CORRECTION

PATENT NO. : 6,514,119 B1
DATED : February 4, 2003
INVENTOR(S) : James S. W. Lee and Chiu Keung Kwan It is certified that error appears in the above-identified patent and that said Letters Patent is hereby corrected as shown below:

Drawings,
Figure 2, delete "210" and insert -- 211 --;

Column 3,
Line 16, delete "torso" and insert -- trunk --;
Line 38, after "ring 31" insert -- . --;

Column 4,
Line 8, delete "comprising";

Column 5,
Line 12, delete "88" and insert -- 80 --;
Line 34, delete "180" and insert -- 181 --;
Line 37, delete "180$r$" and insert -- 181$r$ --;
Line 45, delete "arm" and insert -- leg --;

Column 6,
Line 18, delete "comprising";
Line 22, after "150" insert -- in --;
Line 60, delete "an elbow" and insert -- a knee --;
Line 62, delete "elbow" and insert -- knee --;

Column 7,
Line 12, after "lower" insert -- end --;
Line 13, delete "188" and insert -- 181 --;
Lines 25 and 33, delete "210" and insert -- 211 --;
Line 31, delete "206" and insert -- 216 --;
Line 31, delete "180" and insert -- 181 --;
Line 32, delete "202" and insert -- 202$a$ --;
Line 67, delete "25" and insert -- 28 --;

Column 11,
Lines 52-67, delete all occurrences of "C." and insert -- C --;

Column 12,
Line 65, delete "then" and insert -- than --;

UNITED STATES PATENT AND TRADEMARK OFFICE
CERTIFICATE OF CORRECTION

PATENT NO.    : 6,514,119 B1
DATED         : February 4, 2003
INVENTOR(S)   : James S. W. Lee and Chiu Keung Kwan It is certified that error appears in the above-identified patent and that said Letters Patent is hereby corrected as shown below:

Column 13,
Lines 24 and 33, delete "136" and insert -- 406 --;
Line 43, delete "fourth" and insert -- fifth --;

Column 14,
Line 14, delete "162" and insert -- 436 --.

Signed and Sealed this

Seventh Day of October, 2003

JAMES E. ROGAN
*Director of the United States Patent and Trademark Office*